June 5, 1934.  W. S. FOSTER  1,961,482
WEED DESTROYER
Filed Nov. 18, 1933
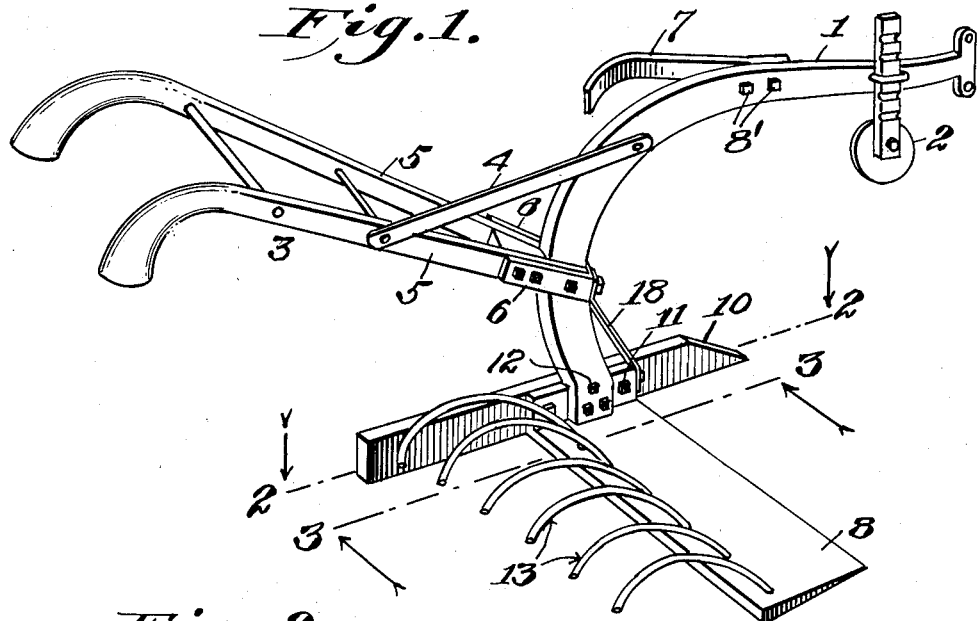
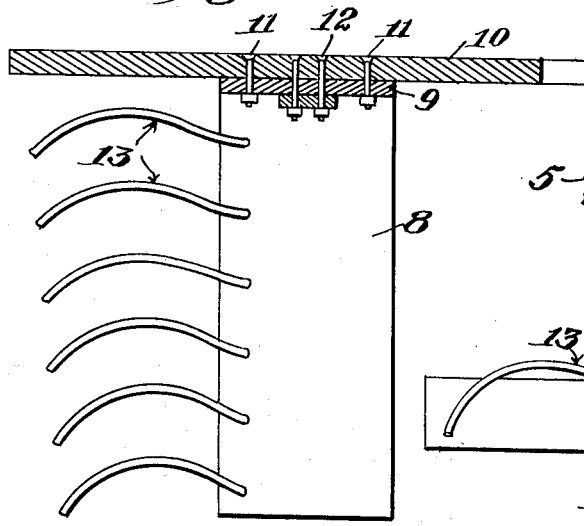
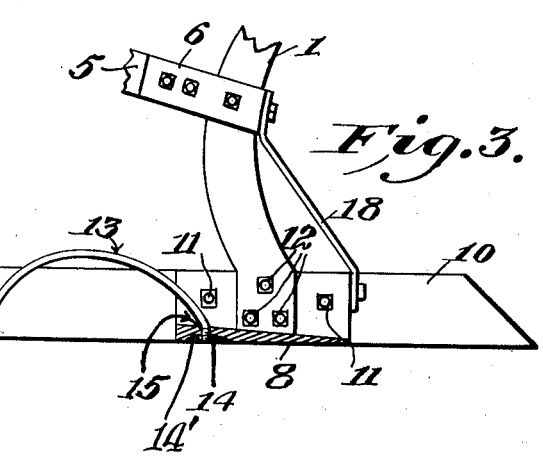
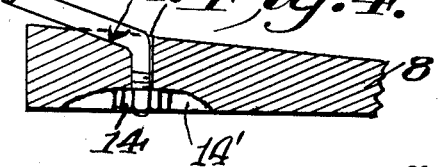
Inventor
William S. Foster.
By E. E. Vrooman & Co.,
His Attorneys.

Patented June 5, 1934

1,961,482

UNITED STATES PATENT OFFICE 1,961,482

WEED DESTROYER

William S. Foster, Dallas, Wis.

Application November 18, 1933, Serial No. 698,702

4 Claims. (Cl. 97—169)

This invention relates to a weed destroyer.

An object of my invention is the construction of a simple and efficient apparatus which can be used upon different types of land, with excellent results for eradicating or destroying weeds.

Another object of my invention is the construction of a weed destroyer, which will cut underground the stalks of the weeds, remove the stalks to the rear of the mechanism, causing said stalks to fall on the plowed land while at the same time the loose dirt will fall on the cut "stubbles", or the weed roots, in the ground, smothering the same, and thereby preventing further growth.

A still further object of my invention is the construction of rods, carried by a shear or cutter blade, which rods are arranged in a peculiar manner and are of a peculiar and efficient structure.

With the foregoing and other objects in view, my invention comprises certain novel constructions, combinations and arrangements of parts as will be hereinafter fully described, illustrated in the accompanying drawing, and more particularly pointed out in the appended claims.

In the drawing:

Figure 1 is a perspective view of an apparatus constructed in accordance with the present invention, while Figure 2 is a sectional view taken on line 2—2, Fig. 1 and looking in the direction of the arrows.

Figure 3 is a sectional view taken on line 3—3, Figure 1, and looking in the direction of the arrows.

Figure 4 is an enlarged fragmentary sectional view of the shear or cutting blade of another embodiment of my invention.

Referring to the drawing by numerals, 1 designates an ordinary plow beam which is provided with the usual plow wheel 2 and handle 3. A brace 4 is provided for strengthening the connection between beam 1 and handle 3. The bars 5, 5 are each strengthened at the plow beam 1 by an angle iron 6, which is suitably connected to the bars and the beam.

A strap iron 7 is fastened at its inner end by bolts 8' to beam 1, with its outer end curved and suitably spaced from the beam to save the left hand handle or bar 5 when turning at the end of the landings. Of course, it is to be understood that the strap iron is only at the left hand side of the beam, because the plow or weed destroyer must always be turned to the left hand on the ground; this strip or strap iron 7 holds the beam off the ground and prevents the handle from dragging.

A shear or cutting blade 8 is provided with an upstanding extension 9 that is placed against the outer face of the landside shoe 10. Bolts 11 extend through the shoe 10 and the upstanding extension 9 for assisting in securing the parts together. The lower end of plow beam 1 is placed against the outer face of upstanding extension 9 and bolts 12 extend through the plow beam, extension 9 and shoe 10, fastening the same together.

Rods 13 are employed. Each rod is not only bowed or curved upwardly as seen in Fig. 3, but it is also curved outwardly as clearly seen in Fig. 2. Each rod is threaded on its inner end and extends down vertically through the shear or cutting blade 8, Fig. 3. On the threaded end is placed a nut 14, within pocket 14' which nut when screwed tightly on the rod 13, causes the rod to bind or clamp at point 15, Fig. 3, so that the rod will not turn upon the shear 3. As seen in Fig. 4, at each vertical aperture 16, through which the rod 13 extends, the shear is formed with a bevelled groove 17, in which the rod will be tightly seated when the nut 14 is screwed tightly, which doubly insures of the rod not turning upon the shear, holding the rod definitely in its desired position on the shear. The groove 17 is entirely within the edges of the shear 8; the deepest, inner end of groove 17 opens upon the aperture 16.

The outer end of each rod is turned outwardly, with a portion of the curved rod between the shear and the outer end, pointing towards the shoe and beam of the apparatus, whereby the cut weeds will be conveyed up the rod and inward towards the main part of the apparatus, and thence outward, to drop upon the cultivated or plowed land. The rods vary in length, being longest at the inner end of the shear and gradually decreasing in length to the outer end of the shear, as will be seen upon carefully examining Fig. 2. This is important because the heaviest load takes place towards the inner end of the shear, since the novel curvature of the rod throws the greater portion of the cut weeds and débris towards the main body of the apparatus, which is desirable, since, as the load passes off the peculiar rods, it is desirable that this load be always deposited on the cultivated or plowed soil, to be free from the next time the operator comes around, in plowing the land. The weeds will be destroyed quickly in the summer time by the hot sun rays, and in winter time, or during early spring cultivating or late fall cultivating, they will be chilled or frozen, thereby preventing the cut stalks from taking root. This all helps to free the land treated from weeds and foreign growth.

A colter 18 is provided, being fastened at its lower end preferably to the upstanding extension 9, and at its upper end to the plow beam.

By using suitable rods in forming my peculiar and novel weed destroyer, a much more simple structure is produced than if thick metal is employed, and in fact, the peculiar placing and bending, to accomplish the novel results that I have herein named, could not be accomplished by anything other than the structure described.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. As a new article of manufacture, a weed destroyer, comprising a landside shoe, a shear with an upstanding extension against said shoe, a plow beam resting on said upstanding extension and having a portion extending down against the outer face of said extension, means securing said shoe, shear and plow beam together, a plurality of rods bowed upwardly from said shear, and means on said rods and shear for positively holding the rods against rotary movement on said shear, each rod extending downwardly and also outwardly in a gradual curve at its outer end.

2. In a weed destroyer the combination of a shoe, a shear secured against said shoe, said shear being provided with a plurality of vertical apertures, a plurality of bevelled grooves entirely within the marginal edges of the upper face of said shear, each groove being shallowest at its outer end and deepest at its inner end, said last-mentioned end opening upon a vertical aperture, said shear being provided in its under face at each vertical aperture with a nut-receiving pocket, rods in said grooves and apertures, and a nut entirely within each pocket and threaded on the inner end of each rod.

3. In an apparatus of the class described, the combination with a shoe, of a shear secured against said shoe, said shear being provided with a plurality of apertures near its rear edge, said shear being provided in its upper face at each aperture with a bevelled groove, a rod in each groove and aperture, and a nut on each of said rods holding the same in place upon said shear.

4. In an apparatus of the class described, the combination with a shoe, of a shear secured against said shoe, said shear being provided with a plurality of vertical apertures near its rear edge, transversely positioned bevelled grooves in the upper face of said shear and within its edges, said grooves being deepest at their inner ends and opening upon said apertures, rods in said grooves and apertures, and means within said shear securing said rods in position upon said shear, each rod curving inwardly intermediate its length towards said shoe and having its outer end extending outwardly from said shoe.

WILLIAM S. FOSTER.